April 20, 1954     E. C. KIEKHAEFER     2,675,835
TRANSMISSION CLUTCH FOR CHAIN SAWS Filed Oct. 7, 1948     2 Sheets-Sheet 1

INVENTOR.
Elmer C. Kiekhaefer
BY Andrus & Seeder
Attorneys

April 20, 1954     E. C. KIEKHAEFER     2,675,835
TRANSMISSION CLUTCH FOR CHAIN SAWS
Filed Oct. 7, 1948     2 Sheets-Sheet 2
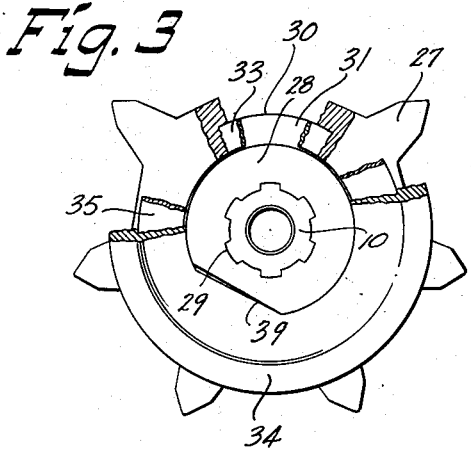
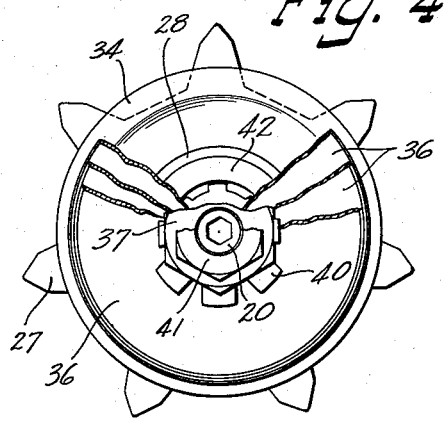
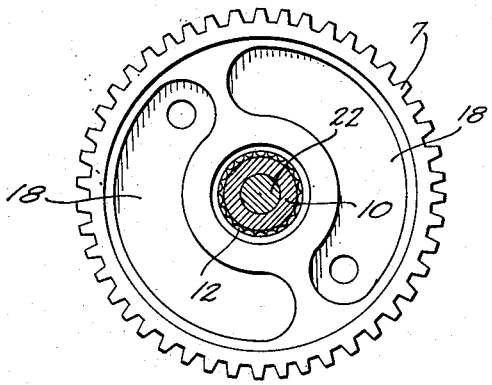
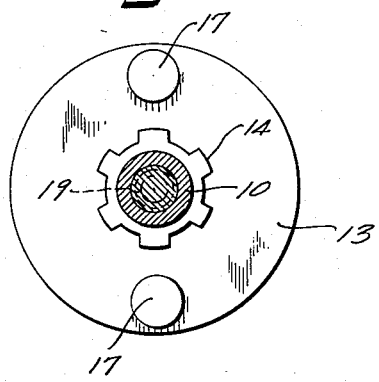
INVENTOR.
Elmer C. Kiekhaefer
BY Andrus & Seedler
Attorneys Patented Apr. 20, 1954

2,675,835

UNITED STATES PATENT OFFICE 2,675,835

TRANSMISSION CLUTCH FOR CHAIN SAWS

Elmer C. Kiekhaefer, Cedarburg, Wis.

Application October 7, 1948, Serial No. 53,204

2 Claims. (Cl. 143—32)

This invention relates to a power drive for implements such as chain saws, and the like.

Power drives utilizing from one and a half to five horse power two-cycle engines require a finger tip clutch control and at the same time a well constructed overload release. Chain saws and the like are subject to frequent high overload conditions tending to stall the engine.

Attempts to utilize control clutches which will provide the desired slip upon overload have been entirely unsatisfactory due to the size, weight and cost involved. Disc clutches, for instance, require too large a clutching surface if any degree of accuracy in slip is to be obtained, and thus the housing must be made larger and the springs and operating mechanism must be made heavier, all of which reduces the portability of the unit and also greatly adds to its cost.

The principal object of the present invention is to provide a power drive in which a finger tip clutch control is obtained with a cushioned torque load without undue weight and cost.

The present invention is based upon the conception that the problem can be solved by employing a very simple light-weight positive in and out clutch which is non-frictional, for the control of the drive, and then employing a simple light-weight slip-clutch to cushion the torque upon closing of the clutch and also to provide the desired overload slip. Both clutches can be readily mounted upon the same shaft and need not take up any more space than that required today for the main drive gear and chain sprocket.

The accompanying drawings illustrate an embodiment of the invention.

In the drawings:

Fig. 3 is an end elevation of the drive shaft of Fig. 2 showing only the friction members of the slip-clutch and chain sprocket and with portions thereof broken away and sectioned;

Fig. 4 is an end elevation of the drive shaft of Fig. 2 looking toward the chain sprocket and slip-clutch and with certain parts of the latter broken away and sectioned;

Fig. 5 is a section taken on line 5—5 of Fig. 2 showing one of the positive clutch elements; and Fig. 6 is a section taken on line 6—6 of Fig. 2 showing the other of the positive clutch elements.

Figure 1:
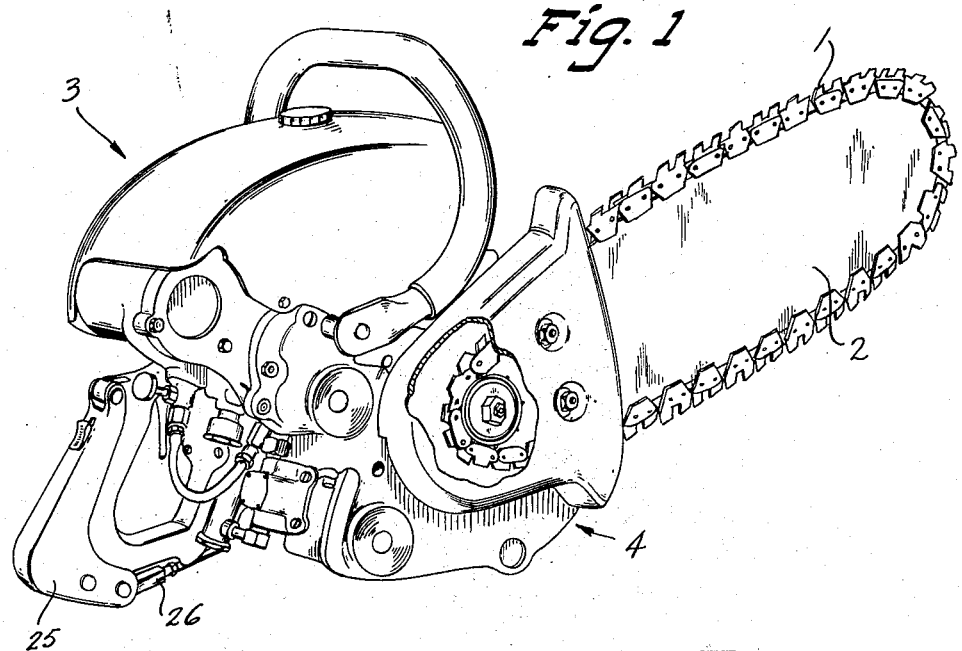
Figure 1 is a perspective view of a chain saw having the power drive of the present invention incorporated therein.
Figure 2:
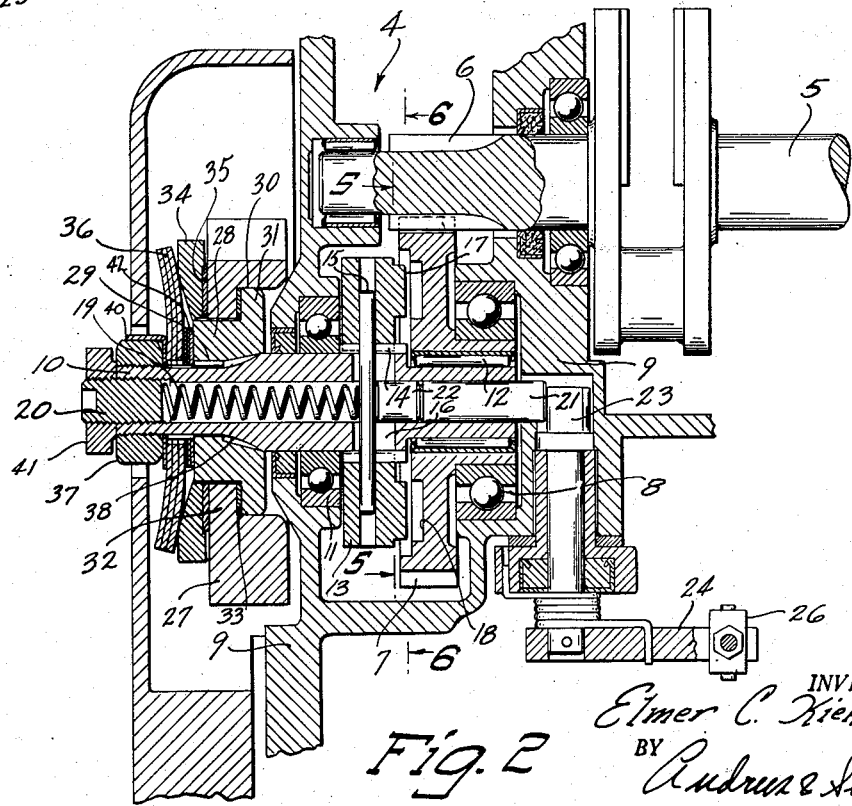
Fig. 2 is an enlarged detail transverse section taken axially of the crankshaft of the engine and the shaft carrying the chain drive sprocket.

The chain saw illustrated comprises, in general, the saw chain 1 operating on a guide rail 2, and an engine 3 having a transmission 4 disposed to drive the chain.

The drive comprises the engine crankshaft 5 having a pinion 6 meshing with a large gear 7 mounted to rotate in a suitable bearing 8 in the case 9 of transmission 4. The hollow shaft 10 is mounted in the bearing 11 in the outer wall of case 9 and the inner end of shaft 10 is carried by the needle bearing 12 within gear 7 to rotate freely with respect thereto.

A positive drive connection is provided between gear 7 and shaft 10 by means of a drive clutch which comprises a thick disc-like clutch member 13 mounted to rotate with the shaft by means of the splines 14. The pin 15 carried by member 13 extends through the axially extending slots 16 in shaft 10 so that clutch member 13 may move axially toward and away from gear 7.

Clutch member 13 has a pair of circular projections constituting clutch teeth 17 on the side adjacent gear 7, and the gear 7 has a pair of circumferentially extending recesses 18 in its side adjacent the clutch member and of a depth corresponding to the height of teeth 17 and disposed to receive the respective teeth.

Clutch member 13 is normally biased into interlocking engagement with gear 7 by means of the coil compression spring 19 disposed in the hollow shaft 10 between pin 15 and the plug 20 threaded into the outer end of the shaft.

Clutch member 13 is moved away from gear 7 to disengage the same by means of the push pins 21 and 22 disposed axially within shaft 10 on the side of pin 15 opposite spring 19 and adapted to push the pin 15 against the spring, thereby effecting the clutch disengaging movement of member 13.

The outer pin 21 is of steel and pin 22 between pins 21 and 15 is of brass to provide at either end the required bearing surfaces upon rotation of shaft 10.

The cam 23 rotated by the lever 24 is disposed to operate pins 21 and 22 and lever 24 is connected to an operating handle 25 by means of the rod 26 for manual operation of the clutch.

The clutch provided by member 13 and gear 7 is a positive engagement type wherein no slip is possible. With such a clutch, the clutching movement is normally small. The required torque can be transmitted through the clutch without requiring large diameters or relatively large axial space for discs and the like.

The chain sprocket 27 for driving chain 1 is mounted upon the outer end of shaft 10, and in accordance with the present invention it embodies within itself a slip-clutch which provides the desired torque cushion to take the shock of starting the saw upon closing of the clutch member 13 with gear 7 and also to prevent stalling of the engine upon momentary overloads.

The slip-clutch is provided by constructing sprocket 27 with an inner hub 28 which is secured by suitable splines 29 upon shaft 10 to rotate therewith at all times and carries sprocket 27 so that the latter is capable of slipping rotationally relative to hub 28.

Hub 28 carries and pilots sprocket 27 at its outer periphery as at 30 of the rim 31. The corresponding complementary rim 32 of sprocket 27 is pressed toward rim 31 with the washer 33 of suitable friction material disposed therebetween. The outer disc member 34 and the washer 35 of suitable friction material are disposed on hub 28 with the washer 35 between sprocket 27 and member 34.

Member 34 is pressed axially of hub 28 by means of the set of disc springs 36 with the perimeter of the innermost spring engaging member 34 to bias sprocket 27 axially of the hub and provide the frictional engagement of sprocket 27 with hub 28 and member 34 through washers 33 and 35. The nut 37 threaded onto the outer end of shaft 10 secures the sprocket 27 and springs 36 in adjustment. The tapered shoulder 38 on the shaft prevents the inward movement of hub 28 of the sprocket under the biasing influence of springs 36. The milled, flat surface on the periphery of hub 28 carrying the disc member 34 engages the corresponding flat 39 within the center hole of member 34 to rotationally secure member 34 and hub 28 and allow limited axial movement under the biasing of springs 36.

The tab washer 40 engaging splines 29 of shaft 10 is provided to secure nut 37 against loosening. The jam nut 41 carried by the projecting end of plug 20 on the outer end of shaft 10 locks the plug to prevent displacement of the same.

Sprocket 27 is made to fit reasonably close upon the central hub 28 of the sprocket at 30 to avoid any tendency toward eccentricity which would wear the frictional surfaces. The slip upon the release of sprocket 27 due to torque overload occurs between the engaging surfaces of member 34, rims 31 and 32, and washers 33 and 35, respectively.

The clamping pressure confining rim 32 between rim 31 and member 34 determines the torque shock or load required to effect slippage. This clamping pressure may be initially determined and established by the selection of the springs 36 to be employed and the number of discs employed for the springs.

The clamping pressure securing rim 32 against slippage may be adjusted and set in any given instance by providing the additional washers 42 on either side of springs 36 as required.

The slip-clutch described provides adequate clamping surfaces without going to larger diameters than that normally employed for the chain drive sprocket and without requiring any additional axial space other than for the Belleville disc springs. This is largely accomplished by reason of the high clamping pressures obtainable with the use of this type of spring.

The combination of a positive engagement clutch and a separate slip-clutch incorporated within the same transmission in the manner described wherein the positive clutch is on the drive gear and the slip-clutch is on the sprocket provides a much simpler and lighter weight construction than would be possible if a single clutch were to be employed which had both drive and slip action.

Various embodiments of the invention may be employed within the scope of the accompanying claims.

I claim:

1. In a portable, lightweight chain saw unit, a high-speed engine, a guide rail, a transmission case secured to said engine and carrying said guide rail, a saw chain operatively disposed and movable about said guide rail for cutting purposes, said saw chain being subject to sudden stoppages, a sprocket adjacent one end of said rail and supporting said chain to move the latter on said rail, a relatively short shaft journally carried by said transmission case and carrying said sprocket, speed reducing transmission means including a member mounted on said shaft for rotation independently thereof and driven by said engine, a manually controlled clutch selectively providing a driving connection between said member and said shaft, a hub fixed on said shaft and adjacent to one face of said sprocket, a friction plate rotationally fixed on said shaft and engaging the other face of said sprocket, and abutment means including a Belleville spring mounted on said shaft in adjustable relation with said plate to maintain a given frictional driving engagement of said hub and said plate with the respective faces of said sprocket whereby the latter is normally rotated by said shaft to drive said chain and is subject to release upon overload independently of said transmission means, said sprocket being carried by said shaft for rotation independently thereof upon such release and subject to nominal inertia forces whereby maximum protection of the chain is afforded and the drive of the chain by said sprocket is responsive to the adjustment of said abutment means independently of said transmission means.

2. The chain saw unit of claim 1 in which the clutch selectively providing a driving connection is a positive engagement clutch, and manual means are provided for actuating the same.

References Cited in the file of this patent

UNITED STATES PATENTS

| Number | Name | Date |
|---|---|---|
| 1,438,077 | Worth | Dec. 5, 1922 |
| 1,575,637 | Neth | Mar. 9, 1926 |
| 1,981,167 | Frost | Nov. 20, 1934 |
| 2,038,626 | Arsneau | Apr. 28, 1936 |
| 2,151,881 | Wilson | Mar. 28, 1939 |
| 2,257,006 | Hall | Sept. 23, 1941 |
| 2,407,114 | Tyler | Sept. 3, 1946 |
| 2,515,986 | Collender | July 18, 1950 |
| 2,516,269 | Starkey | July 25, 1950 |

FOREIGN PATENTS

| Number | Country | Date |
|---|---|---|
| 22,660 | Switzerland | Aug. 17, 1942 |